(12) United States Patent  
Teshima (10) Patent No.: US 6,512,654 B2  
(45) Date of Patent: Jan. 28, 2003

(54) MAGNETIC DISK DRIVING APPARATUS WITH BEARING FIXED WITH CONDUCTIVE ADHESIVE

(75) Inventor: Hiroyoshi Teshima, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 14 days.

(21) Appl. No.: 09/748,342

(22) Filed: Dec. 22, 2000

(65) Prior Publication Data

US 2002/0030926 A1 Mar. 14, 2002

Related U.S. Application Data

(63) Continuation of application No. 09/165,949, filed on Oct. 2, 1998, now abandoned.

(30) Foreign Application Priority Data

Oct. 3, 1997 (JP) ............................................. 9-270253

(51) Int. Cl.⁷ ................................................ G11B 17/02
(52) U.S. Cl. ................................................ 360/99.08
(58) Field of Search ........................... 360/97.02, 98.07, 360/99.08

(56) References Cited

U.S. PATENT DOCUMENTS 4,772,032 A * 9/1988 Raj ............................. 277/80
RE36,016 E * 12/1998 Cap .......................... 360/97.01

FOREIGN PATENT DOCUMENTS

| JP | 63-9717 | 1/1988 |
| JP | 64-31597 | 2/1989 |
| JP | 1-77125 | 5/1989 |
| JP | 2-94103 | 4/1990 |
| JP | 3-91067 | 4/1991 |
| JP | 4-137212 | 5/1992 |
| JP | 5-41075 | 2/1993 |
| JP | 5-81825 | 4/1993 |
| JP | 5-288214 | 11/1993 |
| JP | 5-347066 | 12/1993 |
| JP | 7-6491 | 1/1995 |
| JP | 7-176132 | 7/1995 |
| JP | 7-254213 | 10/1995 |

* cited by examiner

Primary Examiner—A. J. Heinz  
(74) Attorney, Agent, or Firm—RatnerPrestia (57) ABSTRACT

A plate form housing includes a winding. A sleeve which is a bearing is provided in a bearing mounting hole formed in the housing so as to be in the central position of the winding. A shaft mounting a rotor having a magnet confronting the winding supported on the sleeve. A magnetic disk is provided at the end of the shaft. The sleeve is fixed in the bearing mounting hole of the housing by using a conductive adhesive. In this manner, discharge breakdown or destruction of the information recorded in a magnetic disk due to electric charge generated in the magnetic disk rotating at high speed is prevented.

20 Claims, 5 Drawing Sheets

MAGNETIC DISK DRIVING APPARATUS WITH BEARING FIXED WITH CONDUCTIVE ADHESIVE

This application is a Continuation of U.S. Ser. No. 09/165,949, filed Oct. 2, 1998 and now abandoned.

TECHNICAL FIELD OF THE INVENTION

The present invention relates to a magnetic disk driving apparatus for recording information on a magnetic disk.

BACKGROUND OF THE INVENTION

A magnetic disk driving apparatus is, for example, a hard disk drive generally used in a computer.

The bearing of a conventional magnetic disk driving apparatus is a ball bearing, and rotation of the magnetic disk is supported by the ball bearing. Accordingly, the magnetic disk cannot be rotated at high precision. To solve this problem, a magnetic disk driving apparatus using a dynamic pressure fluid bearing has been developed.

In positioning of a magnetic head, high precision positioning of the magnetic head is difficult due to vibration of the ball bearing, whereas high precision positioning of a magnetic head is possible in a magnetic head driving apparatus using a dynamic pressure fluid bearing.

In a recent magnetic disk driving apparatus, the magnetic resistance effect type magnetic head (hereinafter called MR magnetic head) is used for reduction of size of the apparatus main body and high density recording.

However, due to friction between the magnetic disk rotating at high speed and the air, the magnetic disk is electrostatically charged, and a potential difference occurs between the magnetic disk and the magnetic head. If discharge occurs by this potential difference between the magnetic disk and the MR magnetic head, the magnetic resistance effect thin film for composing the MR magnetic head is broken.

To solve this problem, various discharge countermeasures are proposed as earth means of a magnetic disk driving apparatus. These proposals may be summarized as follows.

(1) Earth means of magnetic head

As disclosed in Japanese Laid-open Patent No. 4-137212, a conductive layer of the grounding potential is disposed outside of the MR magnetizing area of the magnetic head slider, and the earth means discharges the charged static electricity through this conductive layer. As disclosed in Japanese Laid-open Patent No. 2-94103, the central potential and reference potential of the MR magnetic head are set at desired potentials, and the current discharged by the capacitor between the MR magnetic head and magnetic disk is kept to a small value by this means.

(2) Earth means between motor shaft and apparatus housing

As disclosed in Japanese Laid-open Utility Model No. 1-31597, a ball preloaded with a spring is provided in the shaft. The ball is brought into contact with the bump of the apparatus housing by this earth means.

(3) Earth means for sliding a contactor fixed in a housing at a motor shaft end.

As disclosed in Japanese Laid-open Patent No. 7-176132 or Japanese Laid-open Patent No. 7-254213, the earth means is composed of a contactor positioned outside of the housing and sliding with the end of motor shaft, and a leaf spring having an electrode with the base end side fixed to the housing, and the leading end side sliding with the contactor.

(4) Earth means of motor shaft and hub

As disclosed in Japanese Laid-open Patent No. 5-81825, the earth means fits a finger such as a leaf spring to the outer circumference of the shaft to slide, as disclosed in Japanese Laid-open Patent No. 5-288214. According to the earth means, a ball preloaded with a spring is provided in the shaft, and the ball slides while abutting against the hub. Alternatively, as disclosed in Japanese Laid-open Patent No. 7-32746, in this earth means, a cylindrical protrusion is provided in a rotating hub, and the cylindrical protrusion is put in a magnetic fluid charged in the shaft.

(5) Earth means of lubricant of dynamic pressure bearing

As disclosed in Japanese Laid-open Patent No. 5-347066, the earth means uses conductive magnetic fluid as lubricant of the dynamic pressure bearing, and as disclosed in Japanese Laid-open Patent No. 1-77125 or Japanese Laid-open Patent No. 7-6491, the earth means uses conductive lubricant as lubricant of the dynamic pressure bearing.

(6) Earth means of ball bearing

As disclosed in Japanese Laid-open Utility Model No. 3-91067, the earth means uses conductive grease as the grease used in the ball bearing.

However, as in (1), in the case of the earth means for preventing discharge breakdown by disposing a special circuit at the magnetic head side only, the cost is very high, and the head mechanism is complicated.

In the earth means in (2) to (4), to prevent discharge breakdown at the motor side, the structure of the magnetic disk driving apparatus is desirably modified.

In the magnetic disk driving apparatus using dynamic pressure fluid bearing high in capacity, since the lubricant is used in the tightening area of the member rather than in the magnetic disk driving apparatus having the ball bearing. Since only conductive lubricant or conductive magnetic fluid is used as the lubricant for the dynamic pressure bearing in (5), the resistance between the magnetic disk and housing (or motor housing) is high. Thus, the problem of discharge breakdown is not solved.

SUMMARY OF THE INVENTION

A magnetic disk driving apparatus of the invention comprises:

(a) a motor including a shaft having a rotor and a bearing fitted to the shaft, (b) a housing accommodating the motor and forming a hole, (c) a magnetic disk disposed in either one of the shaft and the bearing, and (d) a conductive adhesive for connecting at least one pair selected from the group consisting of
   (i) the hole of the housing and the bearing,
   (ii) the hole of the housing and the shaft, and
   (iii) the bearing and the shaft,
in which the magnetic disk and the housing are conducting electrically to each other.

In this constitution, without requiring modification of the motor structure, it is possible to conduct between the magnetic disk and the housing by lowering the electric resistance between the magnetic disk and the housing of the apparatus main body.

By such electric conduction between the magnetic disk and the housing, the electric charge generated in the magnetic disk rotating at high speed can be released to the housing.

As a result, discharge breakdown of the magnetic head is prevented, and destruction of the information recorded in the magnetic head can be prevented.

DETAILED DESCRIPTION OF THE INVENTION

A magnetic disk driving apparatus in accordance with an exemplary embodiment of the present invention comprises a plate form housing disposing an annular winding on the top surface, a bearing fitted in a bearing mounting hole provided in the housing so as to be located in the central position of the winding, a shaft mounting a rotor having a magnetic confronting the winding with the base end supported on the bearing, and a magnetic disk fitted to the end of the shaft, in which the bearing is fixed to the bearing mounting hole by means of a conductive adhesive. In this constitution, the resistance between the magnetic disk and the motor housing is low, and the electric charge generated in the magnetic disk can escape by conducting to the motor housing.

Other magnetic disk driving apparatus in accordance with further exemplary embodiments of the present invention comprises a plate form housing disposing an annular winding on the top surface, a shaft fitted in a shaft mounting hole provided in the housing so as to be located in the central position of the winding, a bearing provided on the outer circumference of the shaft at an upper position of the housing, a hub fitted on the outer circumference of the bearing, and mounting a magnet confronting the winding, and a magnetic disk fitted to the end of the hub, in which at least one of fixing of the shaft mounting hole of the housing and the shaft and fixing of the bearing and the hub is achieved by means of a conductive adhesive. In this constitution, even in the magnetic disk driving apparatus of shaft fixed type, the resistance between the magnetic disk and the motor housing is low, and the electric charge generated in the magnetic disk can escape by conducting to the motor housing.

A different magnetic disk driving apparatus in accordance with further exemplary embodiments of the present invention comprises a thrust bearing having a thrust plate disposed oppositely to the shaft end tightened to a rotor rotatable on a motor housing, and a radial dynamic pressure fluid bearing filled with a lubricating oil between circumferential surfaces of the shaft and a sleeve by forming a herringbone groove in at least one of the shaft and a sleeve for supporting the shaft, in which the sleeve and the housing are adhered and fixed with a conductive adhesive. In this constitution, even in the magnetic disk driving apparatus having the radial dynamic pressure fluid bearing, the resistance between the magnetic disk and the motor housing is low, and the electric charge generated in the magnetic disk can escape by conducting to the motor housing.

A further different magnetic disk driving apparatus in accordance with further exemplary embodiments of the present invention comprises a thrust plate disposed oppositely to the shaft end tightened to a rotor rotatable on a motor housing, and a thrust dynamic pressure fluid bearing having a groove disposed in at least one of the thrust plate fixed to a sleeve for supporting the shaft and the shaft end, in which the sleeve and the housing are adhered and fixed with a conductive adhesive. In this constitution, even in the magnetic disk driving apparatus having the thrust dynamic pressure fluid bearing, the resistance between the magnetic disk and the motor housing is low, and the electric charge generated in the magnetic disk can escape by conducting to the motor housing.

A further different magnetic disk driving apparatus in accordance with further exemplary embodiments of the present invention comprises a thrust plate disposed oppositely to the shaft end tightened to a rotor rotatable on a motor housing, a thrust pivot bearing for receiving a thrust load by fitting the spherical end surface of the shaft to the thrust plate, and a radial dynamic pressure fluid bearing filled with a lubricating oil between circumferential surfaces of the shaft and a sleeve by forming a herringbone groove in at least one of the shaft and a sleeve for supporting the shaft, in which the sleeve and the housing are adhered and fixed with a conductive adhesive. In this constitution, the resistance between the magnetic disk and the motor housing is low, and the electric charge generated in the magnetic disk can escape by conducting to the motor housing.

At the same time, the resistance of the thrust bearing can be reduced, and the magnetic head for high recording density can be used, so that the apparatus can be reduced in size.

A further different magnetic disk driving apparatus in accordance with further exemplary embodiments of the present invention comprises a fixing part holding a thrust defining plate between a shaft fixed to a motor housing and a bush, a rotor holding the thrust defining plate between a sleeve connected to a hub rotatable on the housing and a cover plate, a dynamic fluid pressure bearing including the cover plate, the sleeve and the thrust defining plate, and a radial dynamic pressure fluid bearing having a herringbone groove provided in at least one of the sleeve and the shaft, in which at least one of fixing of shaft and housing and fixing of hub and sleeve is achieved by adhering and fixing with a conductive adhesive. In this constitution, even in the magnetic disk driving apparatus of shaft fixed type, the resistance between the magnetic disk and the motor housing is low, and the electric charge generated in the magnetic disk can escape by conducting to the motor housing.

A further different magnetic disk driving apparatus in accordance with further exemplary embodiments of the present invention comprises a bearing holder fixed to a motor housing, the bearing holder fixed to an outer ring of one ball bearing, and a shaft fixed to an inner ring of other ball bearing, for rotating the shaft by the ball held by the ball bearings, in which at least one of fixing of inner ring of ball bearing and shaft, fixing of outer ring of ball bearing and bearing holder, and fixing of bearing holder and housing is achieved by adhering and fixing with a conductive adhesive. In this constitution, even in the magnetic disk driving apparatus using ball bearings, the resistance between the magnetic disk and the motor housing is low, and the electric charge generated in the magnetic disk can escape by conducting to the motor housing.

In still a further magnetic disk driving apparatus in accordance with further exemplary embodiments of the present invention, the bearing holder is formed integrally with the motor housing.

In a still further different magnetic disk driving apparatus in accordance with further exemplary embodiments of the present invention, the motor housing is formed integrally with the housing of the apparatus main body.

The magnetic disk driving apparatus in accordance with further exemplary embodiments of the present invention is described in detail below while referring to specific embodiments.

(Embodiment 1)

Figure 1:
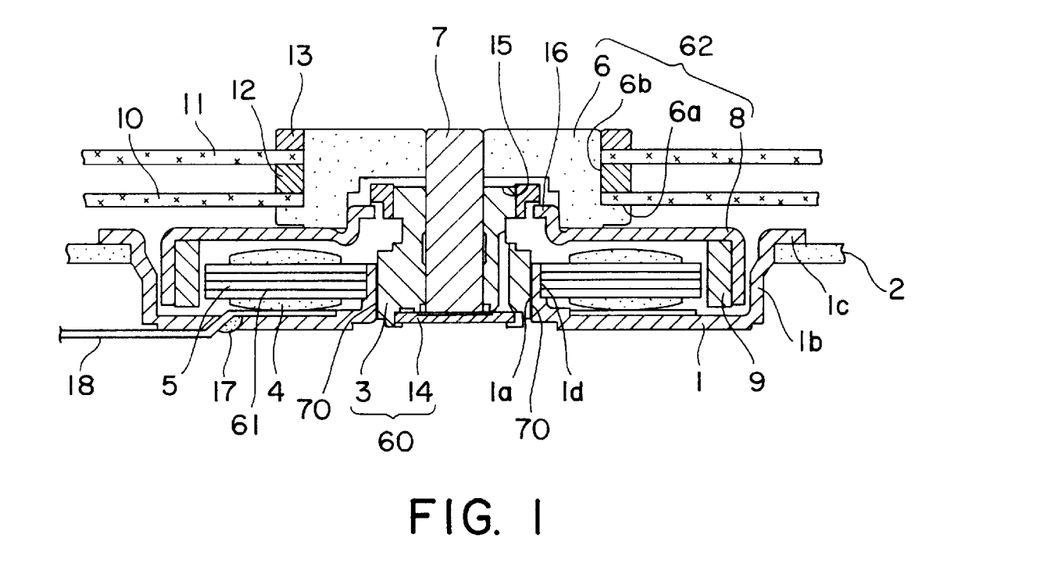
FIG. 1 is a sectional view of a magnetic disk driving apparatus in accordance with a first exemplary embodiment of the present invention.

A magnetic disk driving apparatus in a first exemplary embodiment of the present invention is composed of a motor, a magnetic disk, and a chassis 2 of apparatus main body as shown in FIG. 1.

This motor is a radial type brushless motor composed of a housing 1, a shaft 7, a rotor 62, a winding 61, and a bearing 60.

This bearing 60 is composed of a sleeve 3 and a thrust plate 14.

The housing 1 of the motor is a plate form processed by pressing an aluminum alloy, and the outer circumference of a flange 1c is fitted to the chassis 2 of the magnetic disk driving apparatus main body.

The chassis 2 of the magnetic disk driving apparatus is called the main body housing or chassis, as distinguished from the motor housing 1.

On the upper surface of the motor housing 1, a winding 61 is disposed in an annular form.

This winding 61 is composed of a coil 4 and a stator core 5.

In a bearing mounting hole 1a, for example, in the inner circumference of the central cylindrical part of the motor housing 1, a sleeve 3 is fitted. The stator core 5 on which the coil 4 is wound is fixed on the outer circumference 1d of the central cylindrical part of the housing 1.

The rotor 62 is composed of a hub 6, a rotor frame 8, and a driving magnet 9.

The hub 6 is shaped like a cup, having a disk receiving surface 6a and a cylindrical part 6b for defining the inside diameter of the disk. It is designed to rotate about the shaft 7 of the motor pressed and fixed vertically into the center of the cup-shaped hub 6.

The rotor frame 8 is formed by pressing, and is fixed to the hub 6. In the inner circumference of the cylindrical part of the rotor frame 8, the cylindrical driving magnetic 9 magnetizing N pole and S pole alternately in the circumferential direction is affixed.

The bearing 60 is fitted to the bearing mounting hole 1a provided in the motor housing 1. This bearing 60 is composed of a sleeve 3 and a thrust plate 14, and the base end of the shaft 7 mounting the rotor 62 is inserted and supported in the cylindrical part provided in the center of the sleeve 3.

More specifically, lubricating oil is charged in the sleeve 3 fixed to the bearing mounting hole 1a of the motor housing 1, and this is a thrust bearing designed to generate a dynamic pressure at the ends of the thrust plate 14 and shaft 7 in the thrust direction, and the thrust plate 14 has a spiral groove formed by forging or the like. At two positions across an interval at the inner circumferential side of the sleeve 3, herringbone type grooves are provided to compose a dynamic pressure fluid bearing in the radial direction.

If the motor hub 6 is moved in the thrust direction due to impact or the like, a cylindrical protrusion 16 in the inner circumference of the rotor frame 8 fixed to the hub 6 abuts against the protrusion 15 adhered and fixed to the sleeve 3. Hence, the hub 6 is not pulled out structurally.

In rotation of the magnetic disk, an electric current flows in the coil 4 of the motor, and a magnetic field is generated at the pole of the stator core 5, and a torque is generated between the stator core 5 and the confronting driving magnetic 9 for field system, and the rotor of the motor is put into rotation. By this rotation of the rotor, the magnetic disks 10, 11 clamped on the disk receiving surface 6a of the rotor hub 7 are rotated.

This magnetic disk driving apparatus mounts two magnetic disks 10, 11. The magnetic disk 10 is mounted on the magnetic disk receiving surface 6a of the hub 6, and other magnetic disk 11 is put on through a spacer 12 of the clamp, and they are fixed by a damper 13. This damper 13 is formed by molding polyimide resin or polyamide resin in a ring form, and for fixing the magnetic disks 10, 11, it is designed to press and fix into the cylindrical part 6b of the outer circumference of the hub 6.

A flexible printed board 18 is passed through a slender take-out port 17 in the bottom of the housing 1, and a coil terminal wire is soldered to the land of the motor inner side of this flexible printed board 18, and it is wired to the motor outer side through the flexible printed board 18. The take-out port 17 of the flexible printed board 18 is cured and sealed by an ultraviolet curing type adhesive for sealing from the inner side.

Since the shaft 7 and hub 6 are fixed by pressing, the magnetic disk and shaft 7 conduct with each other.

Since the bearing 60 is a radial dynamic pressure bearing or thrust dynamic pressure bearing, the thrust 7 is rotating without contacting the sleeve 3, and lubricating oil is used as the intermediate medium.

The lubricant is generally an insulator, but the lubricating oil used in the magnetic disk driving apparatus is only several microns in the thickness of oil film, and the insulating resistance can be lowered to such a level as having a conductivity due to effects of ions of the lubricating oil.

In the first exemplary embodiment, a conductive lubricant is used.

A conductive adhesive 70 is used in fixing between the motor housing 1 and the sleeve 3. More specifically, the adhesive 70 is applied on the bearing mounting hole 1a of the motor housing 1, and the sleeve 3 is inserted, and adhered and fixed.

The adhesive used hitherto is generally an insulator, and is a nonconductive adhesive (for example, anaerobic UV type LX0603 of Nippon Loctite Co.), but the conductive adhesive 70 is used in the first exemplary embodiment.

As the magnetic disks 10, 11 rotate at high speed in the air, the magnetic disks 10, 11 receive a resistance from the air layer, and due to friction by this resistance, the electric charge generated in the air is charged on the surface of the magnetic disks 10, 11. In order to allow the electric charge generated on the magnetic disks 10, 11 to escape, conductive members are used. The hub 6, shaft 7, sleeve 3, and motor housing 1 are conductive. By using the conductive adhesive 70 for adhesion of the sleeve 3 and the motor housing 1, there is a conduction while the resistance between the magnetic disks 10, 11 and the apparatus main body housing 2 is low. Accordingly, it is free from electrostatic breakdown of the MR magnetic head.

Figure 2A:
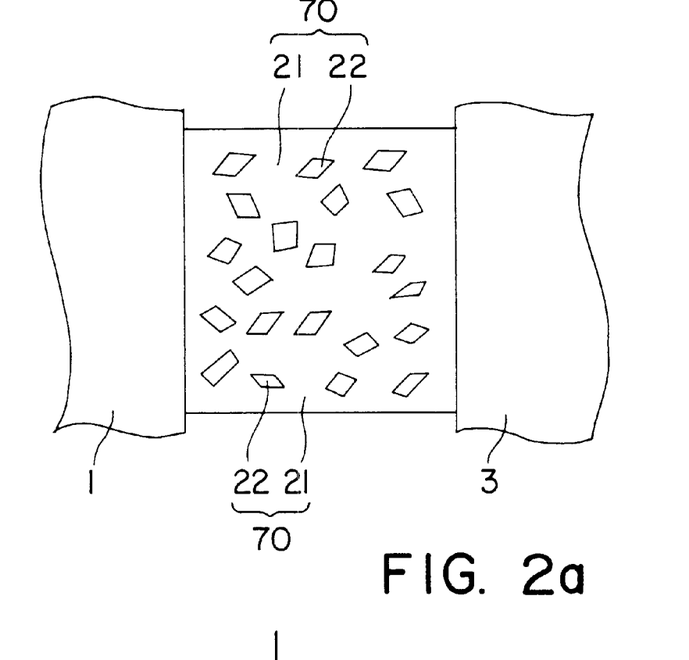
FIGS. 2(a) and 2(b) are explanatory diagrams of the conductive mechanism of a conductive adhesive in accordance with an exemplary embodiment of the present invention.
Figure 2B:
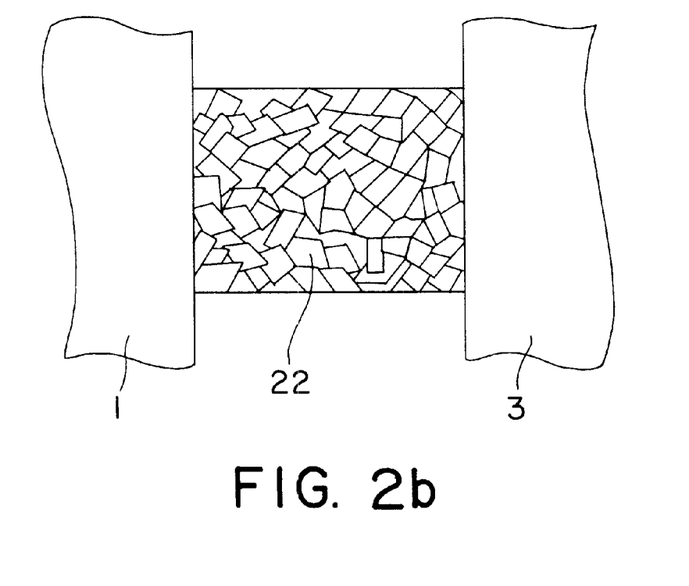

The conductive adhesive 70 is applied between the motor housing 1 and the sleeve 3 as shown in FIG. 2(a) and FIG. 2(b).

Before curing of the conductive adhesive, as shown in FIG. 2(a), a conductive filler 22 is nearly in an insulated state because of a dispersion state. After curing, however, as shown in FIG. 2(b), the binder 21 shrinks in volume at the time of curing, and a conduction is achieved by the internal contact between the conductive fillers 22 and the interface contact between the motor housing 1 and sleeve 3. That is, by volume shrinking at the time of curing, the conductive fillers 22 connect to each other to express conductivity.

As the conductive filler 22, metal powder or carbon is used.

When the conductive filler 22 is metal powder, conduction is achieved by movement of free electrons. However, since the conductive filler is dispersed in the binder of the conductive adhesive, even after curing, the conductive filler is surrounded by an organic binder which is an insulator. When the conductive filler 22 is carbon, the pi-electron is the principal means of conduction.

The conductive adhesive is composed of conductive filler, binder, additive, diluting agent, etc.

Examples of the conductive filler include, among others, gold powder, silver powder, copper powder, nickel powder, aluminum powder, palladium powder, plating powder, carbon powder, and graphite powder. The shape and particle size of these fillers are varied, including flaky, spherical, dentritic, and acicular forms. In the magnetic disk driving apparatus, in order to lower the resistance further, a flaky conductive filler of large particle size is used. For working efficiency when adhering the junction, a flaky conductive filler is often combined with a spherical conductive filler.

The roles of the binder are to bind the conductive filler, to contact between conductive fillers inside the cured object shrinking in volume, and to adhere between the motor housing 1 and sleeve 3. As the binder, epoxy resin, urethane resin, silicon resin, silicone resin, and other thermosetting resin and thermoplastic resin are used. To avoid gas generated from the adhesive, the epoxy resin is particularly preferable as the binder.

Additives include a coupling agent and a diluting agent. To enhance the strength of adhesion, a small amount of the coupling agent is added.

As the diluting agent, monomer resin or solvent is used for adjusting the curing performance or coating efficiency.

Thus, by using the conductive adhesive 70 for fixing the motor housing 1 and sleeve 3, the resistance between the magnetic disk and the motor housing is lowered, and the electric charge generated in the magnetic disk rotating at high speed can be put aside by conducting to the motor housing. In this manner, discharge breakdown of the magnetic head or breakdown of the information recorded in the magnetic disk can be prevented.

In the first exemplary embodiment, the motor housing and the apparatus main body housing are separate, but the same effects are obtained if the motor housing is integrated with the apparatus main body housing.

(Embodiment 2)

Figure 3:
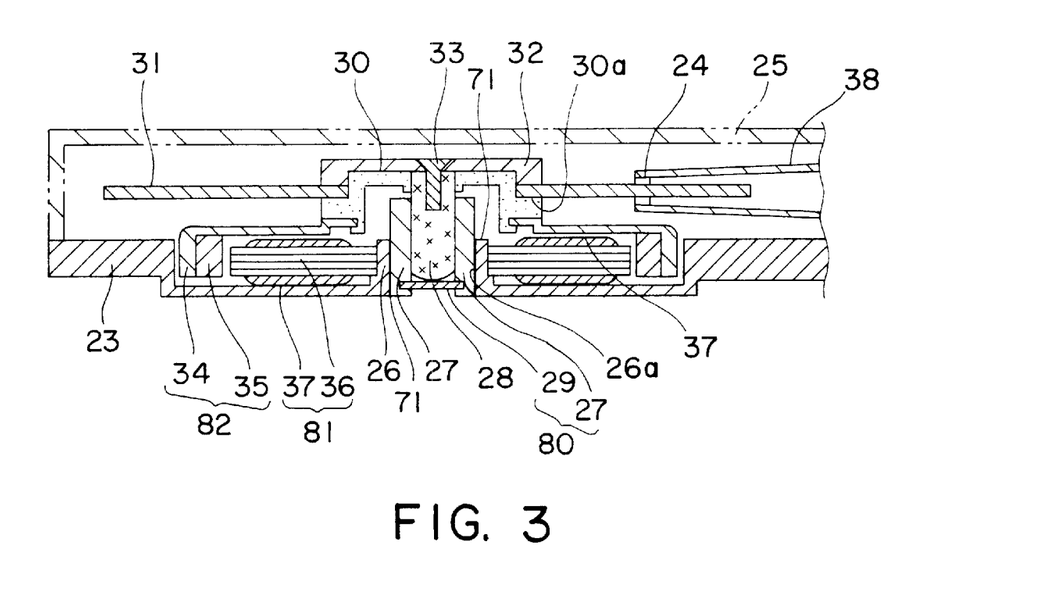
FIG. 3 is a sectional view of a magnetic disk driving apparatus in accordance with a second exemplary embodiment of the present invention.

A magnetic disk driving apparatus in the second exemplary embodiment of the present invention comprises, as shown in FIG. 3, a housing 23, a magnetic head 24, a lid 25 a magnetic disk 31, a damper 32, and a motor.

This magnetic head driving apparatus mounts one magnetic disk 31.

The housing 23 is integral, serving as both motor housing and main body chassis.

The motor is composed in the space formed between the housing 23 and the lid 25, and this space is enclosed.

The motor is composed of a shaft 28, a rotor 82, a winding 81, and a bearing 80.

This winding 81 is composed of a stator core 36 and a coil 37.

The rotor 82 is composed of a hub 30, a rotor frame 34, and a driving magnet 35.

On the upper surface of the housing 23, the winding is disposed in an annular form.

The housing 23 is fabricated by processing an aluminum die-cast forming, or pressing an iron plate.

The lid 25 is fabricated by press-forming an aluminum alloy plate material, or pressing an iron plate.

The motor is disposed on a recess surface of the housing 23. On this recess surface, a bearing mounting hole 26a of a convex part, for example, a cylindrical part 26 is provided integrally with the housing 23, and a sleeve 27 is adhered and fixed in the bearing mounting hole 26a with a conductive adhesive 71.

The bearing 80 is fitted in the bearing mounting hole 26a provided in the housing 23. This bearing includes a sleeve 27 and a thrust plate 29, and the base end of the shaft 28 mounting the rotor is inserted in the cylindrical part formed in the center of the sleeve 27, and the bearing is supported.

More specifically, two herringbone grooves are formed at two positions in the cylindrical part of the inner circumference of the sleeve 27, and the gap between the sleeve 27 and the shaft 28 is filled with lubricating oil. By the dynamic pressure generated along with rotation of the shaft 28, the shaft 28 and the sleeve 27 are supported without making contact, thereby composing a radial dynamic pressure fluid bearing.

For the load in the thrust direction, the end of the shaft 28 is in a spherical form, and a pivot bearing is formed by the metal thrust plate 29 fixed to the sleeve 27 and the shaft end. Since the thrust plate 29 is made of metal, the sleeve 27 and shaft 28 conduct with each other.

A hub 30 made of nonmagnetic material is fixed to the shaft 28. In the hub 30, a flange 30a is formed as being extended in an annular form in the outer circumferential direction, and a magnetic disk 31 is mounted on the upper surface of the flange 30a.

At the upper end of the shaft 28, a screw hole for fitting a clamp screw is formed in the center. By fitting a clamper 32 into the screw hole of the shaft 28 by a screw 33, the magnetic disk 31 is clamped to the hub 30.

At the lower side of the flange 30a of the hub 30, a rotor frame 34 formed of a magnetic material is crimped and fixed to the hub 30. At the outermost peripheral drooping part of the rotor frame 34 fixed to the hub 30, a driving magnet 35 is adhered and fixed.

The driving magnet 35 is annular, and magnetic poles are magnetized in the circumferential direction in the cylindrical inner circumference. Corresponding to the inner circumference, a stator core 36 is fixed to the cylindrical pat 26 of the housing 23.

The number of slots P of the stator core 36 and the number of magnetic poles P of the driving magnet 35 are in the relation of formula (1).

$$S:P=3:4 \tag{1}$$

In the stator core 36 formed by laminating electromagnetic iron plates, a coil 37 is wound on this stator core 36 after being insulated. When power is supplied to this coil 37, by the mutual electromagnetic action of the stator core 36 and driving magnet 35, the magnetic disk 31 mounted on the hub 30 is rotated and driven.

Inside of the magnetic disk driving apparatus, the MR magnetic head 24 is disposed corresponding to the magnetic disk 31. The MR magnetic head 24 is driven by a voice coil motor through an arm 38. In order to read the information of the magnetic disk 31, the MR magnetic head 24 is such an MR magnetic head 24 in which the change in the magnetic field appears as a change in the resistance value.

When the magnetic disk 31 rotates at high speed, static electricity is generated in the magnetic disk by the friction of the upper surface and lower surface of the magnetic disk with the air.

This static electricity not only gives adverse effects on reading and writing of information by the magnetic head, but also charges the rotor of the motor through the motor hub 30. When this electric charge increases, discharge occurs between the rotor and the stator, which causes noise or breakdown of recorded information.

In particular, since the MR magnetic head is susceptible to external factors such as static electricity and abnormal voltage, so as not to charge at high voltage, a conductive adhesive is used in adhesion between the sleeve 27 and the cylindrical part 26 of the housing 23.

To adhere the sleeve 27 and the cylindrical part 26, by using a nonconductive adhesive and conductive adhesive 71, results of measurement of resistance of the damper 32 and housing 23 are shown in Table 1.

TABLE 1

|  | Nonconductive adhesive | Conductive adhesive |
|---|---|---|
| Conduction resistance value | 0.7–5.0 | 0.2–3.0 |

In the measuring method of resistance value, the magnetic disk driving apparatus is rotated at 4200 rpm, the contactor is fitted to the center of the damper 32, and an ammeter is connected in series to the contactor, and connected to the + side of a slight constant voltage power source. The housing 23 is connected to the − side of the slight constant voltage power source. That is, the resistance value is measured by the constant voltage method, and the conduction resistance is calculated in the formula of (slight voltage power source value/current value).

Table 1 shows the fluctuation range of values of the 20 magnetic disk driving apparatuses.

In the case of using the nonconductive adhesive, the results of measurement were 0.7 to 5.0 W, and when using the conductive adhesive 71 of the embodiment 2, results of measurements were 0.2 to 3.0 W. As compared with the prior art, the resistance values were lower when the conductive adhesive of the second exemplary embodiment was used.

As shown in Table 1, by using the conductive adhesive 71 for adhesion of the sleeve 27 and cylindrical part 26, the resistance between the hub 30 and housing 23 can be lowered.

Hence, by using the conductive adhesive for fixing of the cylindrical part 26 of the housing 23 and the sleeve 27, the resistance between the magnetic disk and the housing of the apparatus main body can be lowered, and the electric charge generated in the magnetic disk rotating at high speed is caused to conduct, so that the electric charge can be released.

As a result, discharge breakdown of the magnetic head or destruction of information recorded in the magnetic disk can be prevented.

(Embodiment 3)

Figure 4:
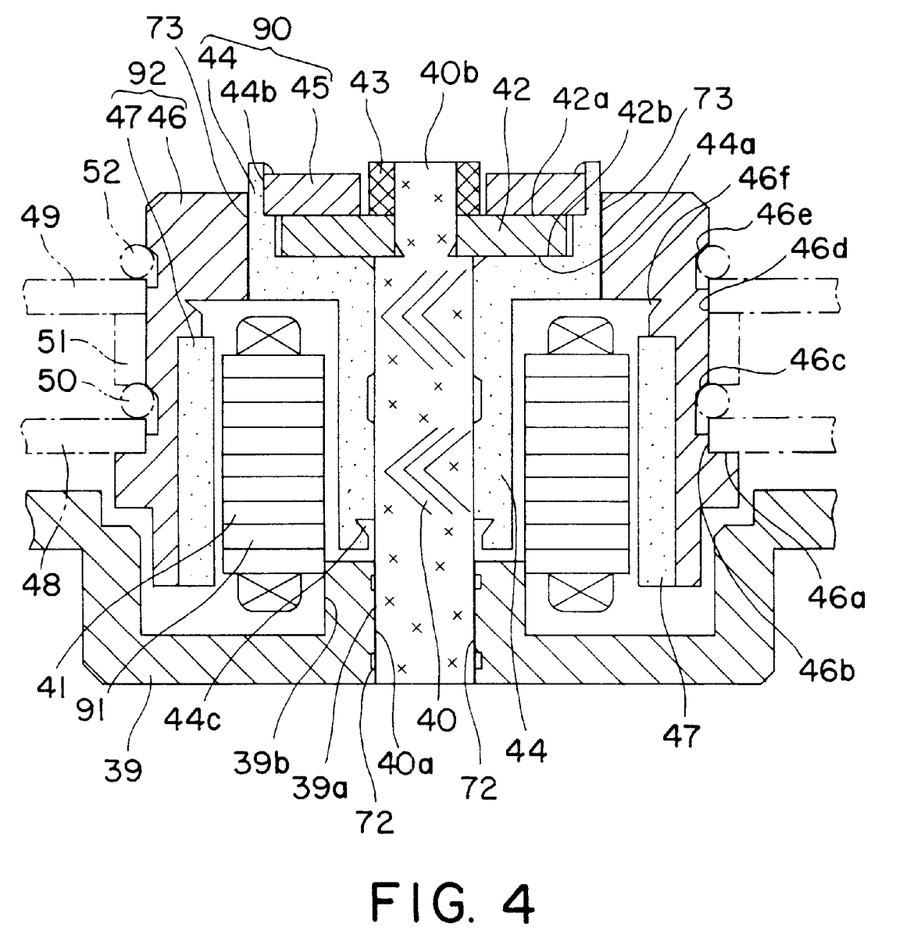
FIG. 4 is a sectional view of a magnetic disk driving apparatus in accordance with a third exemplary embodiment of the present invention.

A magnetic disk driving apparatus in the third exemplary embodiment of the present invention comprises, as shown in FIG. 4, a housing 39, a shaft 40, a thrust defining plate 42, a bush 43, magnetic disks 48, 49, a rotor 92, and a winding 91.

This magnetic disk driving apparatus is a magnetic disk driving apparatus of shaft fixed cantilever type, and mounts two magnetic disks 48 and 49.

The magnetic disks 48, 49, spacer 51, and O-ring 50 to be clamped are indicated by single-dot chain line.

The rotor 92 has a hub 46, a driving magnet 47, and a bearing 90.

This winding 91 is composed of, for example, a stator core 41.

The bearing 90 is composed of a sleeve 44 and a cover plate 45.

The housing 39 is a motor housing and is also a main body chassis at the same time, and is formed integrally.

At the upper surface of the housing 39 in a plate form, the winding is disposed in an annular form. So as to be at the central position of the winding, a shaft mounting hole for fixing the shaft 40 is formed in the housing 39.

The shaft 40 fixing one end 40a in a shaft mounting hole 39a, for example, in the inner circumference of the cylindrical part of the housing 39, and a stator core 41 fixed in the outer circumference 39b of the cylindrical pat are fixed.

The housing 39 and the shaft 40 are fixed by using a conductive adhesive 72, and this adhesive is an aerobic conductive adhesive 72.

A thrust defining plate 42 of steel abuts against the small end step portion of the small diameter part 40b at the other end of the shaft 40, and the thrust defining plate 42 is held and fixed by the bush 43 and the small end step portion. Spiral dynamic pressure generating grooves are formed in the upper and lower surfaces 42a, 42b of the thrust defining plate 42.

The grooves are formed by a forging process, the parallelism of the upper and lower surfaces is defined in a range of 0.002 mm or less, and the surface roughness is 0.001 mm or less at Rmax. In this case, processing is diamond lapping or super-polishing. The grooves are formed so that the groove of the upper side 42a may be at the outer side of the groove of the lower side 42b.

The periphery of the thrust defining plate 42 is filled with lubricating oil, and rotating relative members are desirable so that the thrust defining plate 42 may compose a thrust dynamic pressure fluid bearing. At the lower side 42b of the thrust defining plate 42, a thrust dynamic pressure fluid bearing is composed of the end face 44a of a copper sleeve 44 and the lower side 42b, and at the upper side 42a, a dynamic pressure fluid bearing is composed of a cemented carbide cover plate 45 and the upper side 42a. This cover plate 45 has a disk shape having a central hole, and a spiral groove is formed in the inner circumference of the central hole of the cover plate 45. Generally, this groove is called a visco-seal groove.

There is a very slight gap between the visco-seal groove of the cover plate 45 and the outer circumference of the bush 43, and splash of lubricating oil is prevented by the labyrinth effect. This cover plate 45 is fitted to the maximum circumferential part 44b of the reverse cap form of the sleeve 44, and an ultraviolet curing type adhesive is applied on the outer circumference of the cover plate 45, and is cured to adhere and fix.

The sleeve 44 is composed to enclose the thrust defining plate 42 by the end 44a of the sleeve 44 and the cover plate 45. Accordingly, movement of the sleeve 44 in the thrust direction is defined by the thrust defining plate 45, and when an impact acts on the apparatus, the rotor will not slip out.

In the copper sleeve 44, herringbone grooves are formed in two positions in the inner circumference confronting the shaft 40, and the herringbone grooves are illustrated clearly in the shaft in FIG. 4. The gap between the sleeve 44 and the shaft 40 is filled with lubricating oil. When the sleeve 44 rotates, a dynamic pressure is generated in the herringbone grooves, and the radial dynamic pressure fluid bearing is composed so that the sleeve may rotate without making contact with the shaft 44. The gap between the sleeve 44 and shaft 40 acts to keep constant the center of rotation of the rotor.

For example, when the rotary sleeve 44 is deviated to the left in the diagram, the right side gap increases, and the pressure in the right side gap is smaller than before deviation. On the other hand, the left side gap becomes smaller, and the pressure in this gap is larger than before deviation. When the pressure relation is such the rotary sleeve 44 is pushed to the right, and finally returns to the original position. Therefore, by such aligning action, the dynamic pressure fluid bearing is smaller in deflection.

Therefore, by using the dynamic pressure fluid bearing, a magnetic disk driving apparatus of high recording density demanding higher rotation precision can be realized.

Moreover, at the housing 39 side of the sleeve 44, an oil sump 44c is formed for preventing splash of lubricating oil.

On the outer circumference of the copper sleeve 44, a cylindrical hub 46 made of magnetic material such as stainless steel is adhered and fixed with a conductive adhesive 73. On the inner circumference of the hub 46, a driving magnet 47 is installed at a corresponding position confronting the stator core 41. Magnetic disks 48, 49 are fitted on the outer circumference of the hub 46.

More specifically, the magnetic disk 48 is mounted on the flange 46a of the hub 46, the inner circumference of the magnetic disk 48 is defined by the defining cylindrical part 46b of the hub, and the magnetic disk 48 is clamped by making use of an elastic force of an O-ring 50 by fitting the O-0-ring 50 into a taper notch 46c in the hub 46. The second magnetic disk 49 is mounted on the end of a spacer 51 inserted so as to apply a force to the O-ring in the outer circumference of the hub 46, the inner circumference of the magnetic disk 49 is defined by the defining cylindrical part 46d of the hub, and an O-ring 52 for clamping is fitted into a taper notch 46e formed in the hub 46, so that the magnetic disk 49 is clamped by making use of the elastic force of the O-ring 52. An oil sump 46f is also formed in the hub 46.

A coil is wound around the stator core 41 through an insulator insulated electrically. By changeover of the current flowing in the coil, vibration of the stator core 41 is transmitted to the housing 39, and is further transmitted to the magnetic head. In order to maintain the reliability of writing of information, only part of the stator core 41 is fixed to the housing 49 so that the stator core 41 may be fixed flexibly.

Hence, by using a conductive adhesive for the purpose of fixing of the hub 46 and sleeve 44, and fixing of the shaft 40 and housing 39, the resistance between the magnetic disk and the apparatus main body housing is lowered, and the electric charge generated in the magnetic disk rotating at high speed is caused to conduct, so that the electric charge may be released. As a result, discharge breakdown of the magnetic head or destruction of information recorded in the magnetic disk can be prevented.

When either fixing of the hub 44 and sleeve 46, or fixing of the shaft 40 and housing 39 is achieved by conductive adhesive 72 or 73, the electric charge charged on the magnetic disks 48, 49 can be more or less released to the housing 39.

(Embodiment 4)

Figure 5:
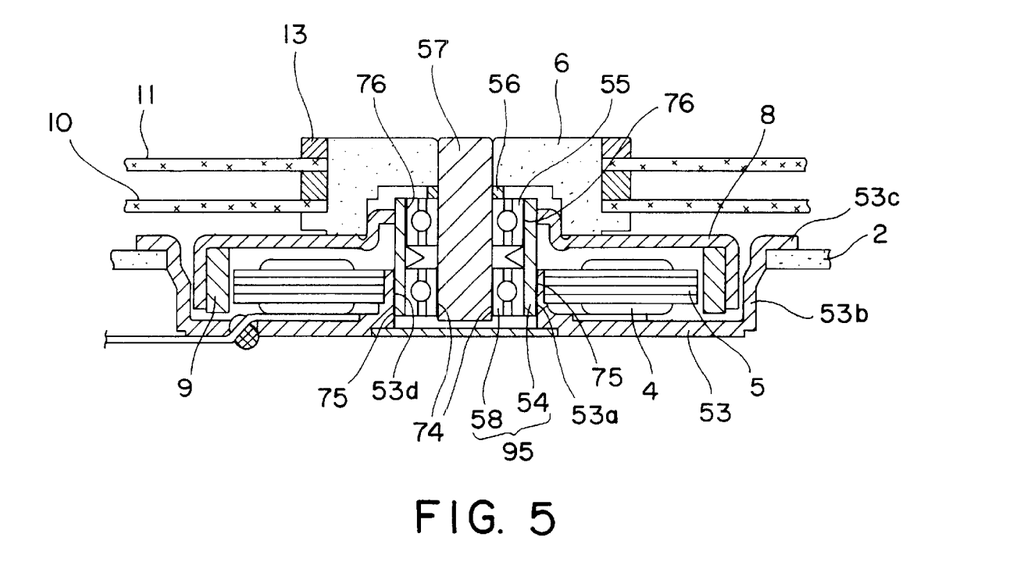
FIG. 5 is a sectional view of a magnetic disk driving apparatus in accordance with a fourth exemplary embodiment of the present invention.

A magnetic disk driving apparatus in a fourth exemplary embodiment of the present invention comprises, as shown in FIG. 5, a motor, magnetic disks 10, 11, and a housing 2 of apparatus main body.

This motor includes a housing 53, a coil 4, a hub 6, a shaft 57, a rotor frame 8, a driving magnet 9, and a bearing 95.

This bearing 95 includes a bearing holder 54, a first ball bearing 55, and a second ball bearing 58.

This magnetic disk driving apparatus can mount two magnetic disks 10, 11.

The motor housing 53 includes a central cylindrical part 53a, an outer cylindrical part 53b, and a flange 53c. Inside of the central cylindrical part 53a, a bearing mounting hole 53d is formed, and a bearing holder 54 is fitted, and a stator core 5 winding a coil 4 is affixed on the outer circumference of the central cylindrical part 53a.

In the center of the hub 6, a shaft 57 is pressed in, and the hub 6 abuts against the first ball bearing 55 through the washer 56. Since the bearing is the first ball bearing 55, the diameter of the shaft 57 may not require the tolerance as in the diameter of the dynamic pressure fluid bearing. In the preloaded state of the first ball bearing 55 and second ball bearing 58, the bearing holder 54 is adhered and fixed to the outer circumference of the first ball bearing 55 by using a conductive adhesive 76, and the shaft 57 is fixed to the inner circumference of the second ball bearing 58 by using a conductive adhesive 74.

The bearing holder 54 and housing 53 are fixed by means of a conductive adhesive 75.

In adhesion between the bearing holder 54 and housing 53, adhesion between the shaft 57 and the inner circumference of the second ball bearing 58, and adhesion between the outer circumference of the first ball bearing 55 and the bearing holder 54, by using nonconductive adhesive and conductive adhesives 74, 75, 76, results of measurement of resistance value of hub and housing are shown in Table 2.

TABLE 2

|  | Ball bearing | | Fluid bearing |
| --- | --- | --- | --- |
|  | Nonconductive adhesive | Conductive adhesive | Conductive adhesive |
| Conduction resistance value MΩ | 6.5–70.0 | 4.6–35.5 | 0.3–4.8 |

Using 20 magnetic disk driving apparatuses, the resistance values were measured.

Similarly as in the case of Table 1, in the measuring method, the magnetic disk driving apparatus is rotated at 4200 rpm, the contactor is fitted to the center of the hub (near the shaft 57 in the hub), and an ammeter is connected in series to the contactor, and connected to the + side of a slight constant voltage power source. The housing 53 is connected to the minus side of the slight constant voltage power source. That is, the resistance value is measured by the constant voltage method, and the conduction resistance is calculated in the formula of (slight voltage power source value/current value).

Table 2 shows the fluctuation range of values of the 20 magnetic disk driving apparatuses. The conduction resistance values are fluctuating.

By way of comparison, further, Table 2 also records the values of measurement when the shaft is floating from the fixing part by dynamic pressure fluid in the magnetic disk driving apparatus using the dynamic pressure fluid bearing shown in embodiment 1.

In the case of using the nonconductive adhesive, the results of measurement were 6.5 to 70.0 W, and when using the conductive adhesives 74, 75, 76 of the embodiment 4, results of measurements were 4.6 to 35.5 W, and when using the conductive adhesive in embodiment 1, results of measurements were 0.3 to 4.8 W.

As compared with the prior art, the resistance values were lower when the conductive adhesives 74, 75, 76 of the fourth exemplary embodiment were used, and it is known that the conduction resistance value was smallest in the case of the dynamic fluid bearing in the first exemplary embodiment.

Meanwhile, it is because of the grease used in the first ball bearing 55 and second ball bearing 58 that the resistance value is considerably higher in a magnetic disk driving apparatus which uses a ball bearing as compared with a magnetic disk driving apparatus which uses a dynamic pressure fluid bearing.

By using the conductive adhesives 74,75, 76 for fixing of the bearing holder 54 and housing 53, fixing of the shaft 57 and the inner circumference of the second ball bearing 58, and fixing of the outer circumference of the first ball bearing 55 and the bearing holder 54, several results are obtained. First, the resistance between the magnetic disks 10, 11 and the motor housing 53 can be lowered. Second, the electric charge generated in the magnetic disks 10, 11 rotating at high speed is caused to conduct. Third, the electric charge can be released. Thus, discharge breakdown of the magnetic head or destruction of information recorded in the magnetic disk can be prevented.

In the fourth exemplary embodiment, the motor housing 53 and the bearing holder 54 are separated. If, however, the bearing holder 54 is integrated with the motor housing 53, the same effects are obtained by using the conductive adhesive for fixing of the shaft 57 and inner circumference of the second ball bearing 58, and fixing of the outer circumference of the first ball bearing 55 and bearing holder 54.

In the fourth exemplary embodiment, the motor housing 53 and the apparatus main body housing 2 are separated. If, however, the motor housing 53 is integrated with the apparatus main body housing 2, the same effects are obtained.

In the fourth exemplary embodiment, the motor housing 53, bearing holder 54, and apparatus main body housing 2 are separated. However, the bearing holder 54 and motor housing 53 may be integrated with the apparatus main body housing 2. In this case, by using a conductive adhesive in fixing of shaft 57 and inner circumference of second ball bearing 58, and fixing of outer circumference of first ball bearing 55 and bearing holder 54, the same effects are obtained.

In the foregoing embodiments, the magnetic disk driving apparatus using dynamic pressure fluid bearing or ball bearing is explained. The invention is not limited to such bearings. The same effects are obtained in the magnetic disk driving apparatus using other bearings as long as conductive adhesive is used.

Thus, according to the magnetic disk driving apparatus of the invention, by fixing the bearing into the bearing mounting hole with a conductive adhesive, without modifying the motor structure, the resistance between the magnetic disk and the apparatus main body housing is lowered, and the electric charge generated in the magnetic disk rotating at high speed is allowed to conduct, and the electric charge can be released. Thus, discharge breakdown of the magnetic head and destruction of information recorded in the magnetic disk can be prevented.

More specifically, by using a conductive adhesive in each fixing, such as fixing of bearing and housing in the motor of shaft rotating type using dynamic fluid bearing, fixing of housing and shaft and fixing of hub and bearing in the motor of shaft fixed type using dynamic fluid bearing, without modifying the motor structure, the resistance between the magnetic disk and the apparatus main body housing is lowered, and the electric charge generated in the magnetic disk rotating at high speed is allowed to conduct, and the electric charge can be released. Thus, discharge breakdown of the magnetic head and destruction of information recorded in the magnetic disk can be prevented.

Also in the case of the motor using ball bearings in motor bearings, by using a conductive adhesive in each fixing, such as fixing of inner circumference of ball bearing and shaft, fixing of outer circumference of ball bearing and bearing holder, and fixing of bearing holder and housing, without modifying the motor structure, the resistance between the magnetic disk and the apparatus main body housing is lowered, and the electric charge generated in the magnetic disk rotating at high speed is allowed to conduct, and the electric charge can be released. Thus, discharge breakdown of the magnetic head and destruction of information recorded in the magnetic disk can be prevented.

Whether the dynamic pressure fluid bearing or the ball bearing is used, the earth means for releasing the static electricity generated in the magnetic disk to the housing side can be provided inexpensively, and the magnetic heads for high recording density such as MR magnetic head, GMR magnetic head, and spin magnetic head can be employed.

What is claimed is:

1. A magnetic disk driving apparatus using a dynamic pressure fluid bearing apparatus, said dynamic pressure fluid bearing apparatus comprising:

(a) a housing having a winding, (b) a fluid bearing fixed within said housing using a electrically conductive adhesive, (c) a shaft rotatably supported on said bearing, said shaft connecting a rotor, and said fluid bearing including a sleeve and a lubrication oil, said sleeve being disposed around said shaft, said lubrication oil being packed between said sleeve and shaft, wherein said electrically conductive adhesive is disposed between said sleeve and said housing.

2. A magnetic disk driving apparatus of claim 1, further comprising a main body chassis which functions as a main body housing, wherein said motor housing is formed integrally with said main body chassis.

3. A magnetic disk driving apparatus having a dynamic pressure fluid bearing apparatus, said dynamic pressure fluid bearing apparatus comprising:

(a) a motor housing, (b) a rotor which is rotatable within said motor housing, (c) a thrust bearing, said thrust bearing including a sleeve, a shaft connected to said rotor, and a thrust plate disposed oppositely to an end of said shaft, and (d) a radial dynamic pressure fluid bearing, said radial dynamic pressure fluid bearing includes
said shaft, said sleeve,
a herringbone groove formed in at least one of said shaft and said sleeve, and
a lubricant oil packed between said shaft and said sleeve, and (e) an adhesive fixed to said sleeve and said housing,
wherein said adhesive is a electrically conductive adhesive having an electric conductivity.

4. A magnetic disk driving apparatus of claim 3, wherein said dynamic pressure fluid bearing apparatus further comprises a main body chassis which functions as a main body housing, and
wherein said housing is formed integrally with said main body chassis.

5. A magnetic disk driving apparatus according to claim 3, wherein a herringbone groove is formed in a least one of (1) said shaft and (2) said sleeve supporting said shaft.

6. The magnetic disk driving apparatus of claim 3,
wherein said lubrication oil is further packed between said thrust plate and said end of said shaft.

7. A magnetic disk driving apparatus using a dynamic pressure fluid bearing apparatus, said dynamic pressure fluid bearing apparatus comprising:
(a) a motor housing,
(b) a rotor which is rotatable within said motor housing,
(c) a thrust bearing,
said thrust bearing includes a sleeve,
a shaft coupled to said rotor, and
a thrust plate disposed oppositely to an end of said shaft,
(d) a radial dynamic pressure fluid bearing,
said radial dynamic pressure fluid bearing includes said shaft,
said sleeve,
a herringbone groove formed in at least one of said shaft and said sleeve, and
a lubricant oil packed between said shaft and said sleeve, and
(e) an adhesive fixed between said sleeve and said housing,
wherein said thrust bearing is a thrust dynamic pressure fluid bearing which includes a further lubricant oil packed between said shaft and said thrust plate, and a groove formed in at least one of (i) an end of said shaft and (ii) said thrust plate, and
said adhesive is a electrically conductive adhesive having an electric conductivity.

8. A magnetic disk driving apparatus of claim 7,
wherein said dynamic pressure fluid bearing apparatus further comprises a main body chassis which functions as a main body housing, and
wherein said housing is formed integrally with said main body chassis.

9. A magnetic disk driving apparatus using a dynamic pressure fluid bearing apparatus, said dynamic pressure fluid bearing apparatus comprising:
(a) a motor housing,
(b) a rotor which is rotatable within said motor housing,
(c) a thrust bearing,
said thrust bearing includes a sleeve,
a shaft coupled to said rotor, and
a thrust plate disposed oppositely to an end of said shaft,
(d) a radial dynamic pressure fluid bearing,
said radial dynamic pressure fluid bearing includes said shaft,
said sleeve,
a herringbone groove formed in at least one of said shaft and said sleeve, and
a lubricant oil packed between said shaft and said sleeve, and
(e) an adhesive fixed between said sleeve and said housing, wherein said shaft has a spherical end surface, said thrust bearing is a thrust pivot bearing,
said spherical end surface receives a thrust load while said spherical end surface is fitted to said thrust plate, and
said adhesive is a electrically conductive adhesive having an electric conductivity.

10. A magnetic disk driving apparatus of claim 9,
wherein said dynamic pressure fluid bearing apparatus further comprises a main body chassis which functions as a main body housing, and
wherein said housing is formed integrally with said main body chassis.

11. A magnetic disk driving apparatus according to claim 9, wherein a herringbone groove is formed in at least one of (1) said shaft and (2) said sleeve supporting said shaft.

12. The magnetic disk driving apparatus of claim 9,
wherein said lubrication oil is further packed between said thrust plate and said end of said shaft.

13. A magnetic disk driving apparatus using a dynamic pressure fluid bearing apparatus, said dynamic pressure fluid bearing apparatus comprising:
(a) a motor housing,
(b) a rotor which is rotatable within said motor housing,
(c) a shaft rotatably coupled with said rotor,
(d) a sleeve fixed with said motor housing using an adhesive, said sleeve being disposed around said shaft, said shaft being supported by said sleeve,
(e) a thrust plate fixed with said sleeve, said thrust plate being disposed oppositely to an end of said shaft, and
(f) a lubrication oil disposed between said sleeve and said shaft,
wherein said adhesive is an electrically conductive adhesive, and said electrically conductive adhesive is disposed between said sleeve and said motor housing.

14. The magnetic disk driving apparatus of claim 13,
wherein said lubrication oil and said sleeve form a radial dynamic pressure fluid bearing, and
said shaft rotating through said radial dynamic pressure fluid bearing.

15. The magnetic disk driving apparatus of claim 13, further comprising a further lubrication oil disposed between said shaft and said thrust plate,
wherein said further lubrication oil and said thrust form a thrust fluid bearing, and
said shaft rotating through said thrust bearing.

16. The magnetic disk driving apparatus of claim 13, further comprising a further lubrication oil disposed between said shaft and said thrust plate,
wherein said lubrication oil and said sleeve form a radial dynamic pressure fluid bearing,
said further lubrication oil and said thrust plate form a thrust fluid bearing, and
said shaft rotating through said radial dynamic pressure fluid bearing and thrust fluid bearing.

17. The magnetic disk driving apparatus of claim 13,
wherein in at least one of said sleeve and said shaft is formed a herringbone groove in a surface thereof, said lubrication oil is further packed in said herringbone groove.

18. The magnetic disk driving apparatus of claim 13, wherein in at least one of said end of shaft and said thrust plate is formed a further groove in a surface thereof, said lubrication oil is further packed both in said further groove.

19. The magnetic disk driving apparatus of claim 13, further comprising an oil sump disposed between said shaft and said sleeve, wherein said lubricant oil is packed both (i) in said oil sump and (ii) between said sleeve and said shaft.

20. The magnetic disk driving apparatus of claim 13, wherein said shaft has a spherical end surface, said thrust bearing is a thrust pivot bearing, said spherical end surface receive a thrust load while said spherical end surface if fitted to said thrust plate.

* * * * *